United States Patent Office 3,147,123
Patented Sept. 1, 1964

3,147,123
METHOD OF IMPROVING THE TENDERNESS OF MEAT AND COMPOSITION THEREFOR
Stephan L. Komarik, Chicago, Ill., assignor to The Griffith Laboratories, Inc., Chicago, Ill., a corporation of Illinois
No Drawing. Filed July 6, 1962, Ser. No. 208,101
11 Claims. (Cl. 99—107)

The tenderization of tough meat has been a problem of mankind since of old. The Romans pickled their meats in wine vinegar, the Huns tenderized their meat under their saddle and the Indians wrapped their meat in papaya leaves.

This application is a continuation-in-part of my copending application Serial No. 794,864, filed February 24, 1959, now abandoned, and of my copending application Serial No. 89,917, filed February 17, 1961, now abandoned.

Not much progress has been made during our age to solve this old problem and the results obtained have not been foolproof solutions.

One method of tenderizing meat is to place a section of the carcass meat in a refrigerated room for one or two months, temperature 45° F. This is a very costly and wasteful process. Mold developing on the surface of the meat must be trimmed away and the fat on the meat develops rancidity. Furthermore, only choice or Grade "A" meat may be tenderized in this way. Lower grades never get tender by such aging.

Keeping carcass meat for a short period of time under sterile lamps in a high humidity atmosphere at a temperature of 60° to 90° F. improves the flavor but the tenderness is changed very little.

The method of treating beef steaks with enzymes such as papain, bromelin, ficin, and the like tenderizes the meat but it has several shortcomings. The most troublesome is that the enzymes work and react on the surface of the meat. This is because there is no osmotic action of the enzymes as there is in the curing of meats with salts where an exchange takes place between the meat juices and heavier metals such as salts. For this reason, meat cannot be left exposed too long to the action of enzymes for, if it is, the surface of the steaks becomes mushy and inedible while the center is not sufficiently tenderized. The enzymatic action, therefore, must be stopped before it damages the meat. There are two ways to stop this action, and they are:

(1) By keeping the treated meat in a freezer, or
(2) By cooking the meat to a temperature which destroys the enzyme.

To prevent excessive enzymatic action, the meat has to be treated rapidly and cooked or frozen immediately. If the meat is kept under regular refrigeration or cooler temperatures of 34° F. to 48° F. for any short period of time, the enzymes hydrolyze the meat protein, break it down and make it mushy.

Meat processors who are manufacturing enzyme tenderized meat products must speed up their production line to avoid over tenderization of the treated meats by the enzymes. Such manufacturers thus often dip the meat, usually steaks from low grade meat such as canners or cutter, then package it immediately in boxes and in 10 minutes' time transfer the boxes to a sharp freezer for quick freezing. Any delay in this operation makes the surface of the meat mushy and undesirable. Such meat, and usually steaks, generally is sold only for institutional and restaurant trade where a well-trained chef knows how to handle this type of meat to avoid further damage. During storage the meat must be kept frozen. When the meat is thawed out the enzymes start to work again and make it mushy unless it is cooked quickly. The thawing period, therefore, must be very short, if at all. Semi-frozen or frozen meat (steaks) treated with enzymes are advisably put on the broiler, frying pan or pot dircetly without prior thawing and broiled, fried or cooked and served.

Enzyme tenderizing of meat by the general public utilizing products sold retail in dry or liquid form has not been very satisfactory because instructions which must be followed precisely are often ignored or variations thereof employed. In addition, such products are not very stable and, accordingly, variable results are obtained.

Another shortcoming of tenderizing meat with enzymes is that this process is only suitably used on meats to be broiled or fried. Attempts to tenderize meat to be boiled or water cooked have failed because the meat falls apart during cooking.

According to one aspect of the present invention, it has been found that uncured, unground fresh meat, including meat from animals such as beef, pork, lamb, horse meat and mutton, can be improved significantly in quality and tenderness by applying a small amount of a nontoxic physiologically acceptable basic pyrophosphate salt to the meat. The tenderizing effect increases over a 24 hour period on storage in a cooler without further change on longer storage and with no development of mushiness.

The invention is particularly applicable to the tenderization of meat cuts or chunks of fresh, uncured, unground meat cuts, as distinguished from ground and finely chopped meat and cured meat and is further characterized by its suitability for use by commercial meat houses rather than the retailer or consumer.

The water soluble nontoxic physiologically acceptable inorganic phosphates other than the basic pyrophosphate salts, when applied to uncured fresh meat cuts, do not give the height of tenderness achieved in meats treated with a basic pyrophosphate salt.

Basic pyrophosphate salts which can be used to increase the meat tenderness include the tetraalkali metal pyrophosphates such as the tetrasodium and tetrapotassium salts. The alkali metal acid pyrophosphates are not suitable for increasing the tenderness of meat but can be used as an adjunct such as pH adjustment.

The basic pyrophosphate salt can be applied dry or in liquid form to the meat. In dry form, the pyrophosphate may be applied directly to the meat by dusting or passing the meat over and in contact with a pan of the pyrophosphate in powder form. To achieve thorough distribution of the pyrophosphate over the meat it may be first combined with a carrier or diluent such as sugar or salt. The most advisable way to apply the basic pyrophosphate to meat is by dipping the meat in an aqueous solution of the basic pyrophosphate. However, the aqueous pyrophosphate solution also may be sprinkled or sprayed onto the meat. Other materials such as salt or flavoring agents, like sodium glutamate, may be included with the phosphates and applied to the meat simultaneously.

The amount of pyrophosphate applied to the meat to obtain the described advantages is not narrowly critical. However, amounts of pyrophosphate in excess of about 8 ounces per 100 pounds of meat serve no useful purpose since the desired tenderness is obtained in maxima with 8 ounces or less but with especially tough meats 8 to 12 ounces of pyrophosphate can be used without developing a foreign taste in the meat. In general, though, it is advisable to employ a minimum of about 2 ounces of pyrophosphate per 100 pounds of meat. The presently preferred amount of pyrophosphate to be added, however, is about 4 ounces per 100 pounds of meat.

The tenderizing action of the basic pyrophosphate on meat is considerably slower than proteolytic enzymes, and it is generally advisable to hold the meat cuts so treated for at least 6 hours before cooking the meat. The phosphate treated meats accordingly need not be frozen or cooked immediately as there is essentially no danger of over tenderization. This is an obvious advantage to the meat packer, both as to preparing and packing the meat as well as in distributing it without freezing it, as well as those on the consumer level who would treat meat according to this process. It is adequate to merely keep the meat at regular refrigerator temperatures without further precautions. At such temperatures it may be kept as long as 5 to 7 days without adverse effects. To obtain the osmotic action of the basic pyrophosphate on the meat and permit it to penetrate to the center of the meat and effect tenderization throughout, it is advisable not to cook the meat for at least 6 hours, and advisably up to 16 or more hours after treatment. Thicker steaks or meat cuts one inch or over obtain good tenderization in about 16–24 hours in a holding cooler at 38 to 42° F.

It has also been found that meat can be treated with a basic pyrophosphate and a very small but effective amount of a meat tenderizing proteolytic enzyme simultaneously or concomitantly to increase the meat tenderness that this can be done without quickly freezing the meat cuts after treatment to prevent damage thereto as would result without the pyrophosphate being present. Meat so treated can be stored under normal refrigeration without any undue precautions and tenderness is obtained without the development of mushiness. The pyrophosphate through the osmotic action it creates carries the proteolytic enzyme throughout the meat and thus thoroughly distributes it so that enzymatic action is not restricted to the meat surface.

Various proteolytic enzymes work in combination with basic pyrophosphates but the preferred one is papain.

The amount of enzyme required to effect the tenderization in combination with the basic pyrophosphate is different for each enzyme, its proteolytic activity (i.e., purity or concentration) and the kind and grade of meat being treated. The amount of enzyme used is self-limiting since this invention is directed to storage of the meat in a cooler. If too much enzyme is used the meat will become unsuitable for human consumption. The amount of proteolytic enzyme, and particularly papain, used need not usually be over 2.00 gm. nor less than 0.025 gm., per 100 pounds of meat. Advisably, about 0.30 to 100 gm. of enzyme per 100 pounds of meat is used. Meat cuts treated with both the pyrophosphate and enzyme can be kept in a cooler (temp. 38–42° F.) for from 1 to 7 days without any damage to the meat if such amounts of enzyme are used. Of course, the amount of such a composition used per 100 pounds of meat must be intelligently fixed to give the sought for result. Because meat is a biological material, the amounts used are to be applied with due regard to the type of meat as to animal source, the cut or carcass part and the age of the animal. These are a few of the main considerations to be evaluated in fixing the amount of enzyme and basic pyrophosphate to be applied.

The process of this invention is particularly useful for improving the quality and edibility of beef cuts as measured by tenderness. Beef when treated with basic pyrophosphates has its quality raised about one grade. Thus, a canner grade steak is raised to, or better than, a commercial grade, a commercial grade to a choice grade, and a choice grade equal to grade A–1.

Because of the increased tenderness of cuts treated with basic pyrophosphates, and in combination with proteolytic enzymes, ready-to-eat dishes such as beef stew, beef pie, swiss steaks, pot roast and chop suey can be prepared with basic pyrophosphate treated lower grade meat than the commercial, or better grade now thought necessary for acceptable edibility of such dishes.

The invention also may be employed in the production of superior canned uncured meat products. Beef generally used in these products is of canner or cutter grade and while the meat is rendered edible because of the high temperatures used in the canning process, the meat, nevertheless, remains stringy. Basic pyrophosphate treated meats of such grades, as well as those also treated with an enzyme, are much more tender and less stringy when used in canned meat products.

All of these advantages are obtained without foreign flavor or odor being imparted to the meat when a basic pyrophosphate is used in the recommended amounts wholly adequate for the purposes.

The following examples report tests made using the process of this invention. To properly evaluate the tenderness of beef, a piece of meat from the largest single muscle, which is the longissimus dorsi, or rib eye, was selected from the beef carcass since this muscle is of greater uniformity than any other.

*Example 1*

Meat used: Canner grade rib eye—diced to 1″ dimensions.

Test material: Dry—Tetrapotassium pyrophosphate, control—Nothing,

Control: 907.20 gms. of diced meat wrapped in cellophane and put in cooler, temperature 34°–36° F., for over-night storage.

Treated: 907.20 gms. of meat from the same rib eye was diced, mixed with 0.25% of tetrasoduim pyrophosphate based on the raw weight of meat, wrapped in cellophane and put in a cooler, temperature 34°–36° F., for over-night storage.

The following day both contral and treated meat were placed in separate stainless steel containers. 40% of water was added to each lot and simmered for 1 hour, temperature 208°–210° F.

A taste panel of 10 persons rated meat for tenderness as follows:

Control: Tough and hard to chew.
Treated: Very tender.

*Example 2*

Meat used: Canner grade rib eye—sliced to 1″ thickness.
Test material:
    Control—Nothing.
    Treated—
        (a) Liquid (Solution No. 1):
            50% by wt. tetrapotassium pyrophosphate.
            50% by wt. water.
        (b) Dry—Tetrasodium pyrophosphate.
Treatment:
    Control—6 slices weighing 885.0 gms. were wrapped individually in cellophane and put in cooler, temperature 34°–36° F.
    Liquid treated—6 slices weighing 885 gms. were dipped in tetrapotassium pyrophosphate solution, wrapped individually in cellophane and put in cooler, temperature 34°–36° F. Time of steaks in liquid—6 minutes.

Dry treated—6 slices weighing 885 gms. were dusted with powdered tetrasodium pyrophosphate, wrapped individually in cellophane and put in cooler, temperature 34°–36° F.

Weights and pickup of tenderizers:

|  | Raw weight, gms. | After treatment, gms. | Picked-up weight, gms. | Finished weight after 24 hrs., gms. | Percent |
|---|---|---|---|---|---|
| Control | 885 | -------- | -------- | 881.5 | 99.6 |
| Liquid | 885 | 904.5 | 19.5 | 889.0 | 100.4 |
| Dry | 885 | 887.5 | 2.25 | 885.0 | 100.0 |

After 24 hours in the cooler, two steaks from each lot were placed on the same broiling plate and were broiled for 7½ minutes on each side—broiling temperature 350° F.

Taste evaluation:
  Control—Tough.
  Liquid treated—Tender.
  Dry treated—Not as tender as liquid treated but much more tender than control.
Flavor evaluation: Liquid treated steaks had slight metallic taste, dry treated had better flavor than control.
Analysis for added phosphates:
  Liquid treated—1.18%.
  Dry treated—0.30%.

Higher percent of added phosphates in the liquid treated steaks is responsible for the metallic flavor.

The second lot of steaks were removed from cooler after 48 hours and treated in the identical way as the first lot. Findings were identical to the first lot.

*Example 3*

Meat used: Canner grade rib eye—sliced to 1″ thickness.
Test material:
  Control—Nothing.
  Liquid treated (Solution No. 1)—
    50% by wt. tetrapotassium pyrophosphate.
    50% by wt. water.

| Test No. | Dipping time | Raw weight, gms. | Dipped weight, gms. | Percent pick-up | Holding weight, gms. | Holding period |
|---|---|---|---|---|---|---|
| 1A | Control | 264 | -------- | -------- | -------- | 30 min. |
| 2A | 1 min. dip | 245 | 253 | 3.2 | -------- | Do. |
| 3A | 5 min. dip | 236 | 249 | 5.5 | -------- | Do. |
| 4A | 10 min. dip | 221 | 234 | 5.8 | -------- | Do. |
| 1B | Control | 246 | -------- | -------- | 244 | 4 hours. |
| 2B | 1 min. dip | 278 | 285 | 2.5 | 281 | Do. |
| 1C | Control | 228 | -------- | -------- | 229 | 16 hours. |
| 2C | 1 min. dip | 246 | 257 | 4.4 | 249 | Do. |
| 3C | 10 min. dip | 241 | 248 | 2.9 | 241 | Do. |

1, 2, 3, 4, with suffix A, were broiled 30 minutes after treatment at temperature of 350° F. for 7 minutes each side. No tenderizing was effected at this stage. All treated steaks showed a decided pinkish cast of surface not evident on control. Metallic flavor was also noticeable on the treated steaks.

1B and 2B were broiled 4 hours after treatment at temperature of 350° F. for 7 minutes on each side. No tenderizing effect at this stage was noticed. No pinkish cast on the surface as was observed on the 30 minute test.

1–2–3C. Both steaks which were treated were much more tender than control. No pinkish cast on surface. Metallic flavor noticeable on treated.

*Example 4*

Meat used: Canner grade rib eye—sliced 1″ thick.
Test material:
  Control—Nothing.
  Liquid treated (Solution No. 2)—
    25% by wt. tetrapotassium pyrophosphate.
    75% by wt. water.

| Test No. | Dipping time | Raw weight, gms. | Dipped weight, gms. | Percent pick-up | Holding weight, gms. | Holding period, hrs. |
|---|---|---|---|---|---|---|
| 5B | Control | 206 | -------- | -------- | 205 | 4 |
| 6B | 1 min. dip | 237 | 243 | 2.5 | 241 | 4 |
| 5C | Control | 252 | -------- | -------- | 253 | 16 |
| 6C | 1 min. dip | 234 | 242 | 3.4 | 240 | 16 |
| 7C | 5 min. dip | 216 | 224 | 3.7 | -------- | 16 |
| 8C | 10 min. dip | 204 | 210 | 2.8 | 208 | 16 |
| 5D | Control | 241 | -------- | -------- | 240 | 24 |
| 6D | 1 min. dip | 229 | 240 | 4.8 | 239 | 24 |
| 7D | 5 min. dip | 246 | 254 | 3.2 | 250 | 24 |
| 8D | 10 min. dip | 237 | 244 | 2.9 | -------- | 24 |

5B and 6B after 4 hours holding time showed little effect of tenderization. No pinkish cast on surface. Slight metallic flavor still noticeable.

8C after 16 hours holding time showed decided tenderness over 5C control. No pinkish cast on surface. Slight metallic flavor still noticeable.

6D and 7D after 24 hours holding time showed decided tenderness over control. Even less metallic flavor than in 8C. Hardly noticeable.

*Example 5*

Meat used: Canner grade rib eye—sliced 1″ thick.
Test material:
  Control—Nothing.
  Liquid solution No. 3—
    12.50% by wt. tetrapotassium pyrophosphate.
    87.50% by wt. water.

| Test No. | Dipping time | Raw weight, gms. | Dipped weight, gms. | Percent pick-up | Holding weight, gms. | Holding period, hrs. |
|---|---|---|---|---|---|---|
| 10A | Control | 234 | -------- | -------- | 233 | 24 |
| 10B | Sol. 3, 2 min | 244 | 259 | 6.2 | 257 | 24 |

10B dipped in Solution No. 3 after 24 hours holding time was far more tender than the control. No pinkish cast. Not a trace of metallic flavor.

*Example 6*

Meat used: Canner grade rib eye—sliced 1″ thick.
Test material: Control—Nothing.
  Liquid Solution No. 5—
    12.50 oz. tetrapotassium pyrophosphate.
    87.50 oz. water.
    16.00 oz. glycerol.
    50 gm. monosodium glutamate.
    63 gm. liquid vegetable hydrolysate.
    0.88 gm. papain (3,800 hemoglobin units/gm.).

| Test No. | Material | Dip time, min. | Raw weight, gms. | Dipped weight, gms. | Percent pick-up | Holding weight, gms. | Holding period, hrs. |
|---|---|---|---|---|---|---|---|
| 10A | Control | -------- | 234 | -------- | -------- | 233 | 24 |
| 10C | Sol. No. 5 | 2 | 234 | 248 | 5.9 | 246 | 24 |

10C dipped in Sol. No. 5. After 24 hours holding time it was slightly more tender than 10B in Example 5. The phosphate carried the enzymes through osmosis right to the center of the meat, made the steak tender throughout without any damage, thus making this treatment practical.

Example 7

Meat used: Canner grade rib eye—sliced 1″ thick.
Test material:
    Control—Nothing.
    Liquid Solution No. 3—
        12.50% by wt. tetrapotassium pyrophosphate.
        87.50% by wt. water.

| Test No. | Material | Dip time, min. | Raw weight, gms. | Dipped weight, gms. | Percent pick-up | Holding weight, gms. | Holding period, hrs. |
|---|---|---|---|---|---|---|---|
| 12A | Control | 1 | 166 | -------- | -------- | 166 | 16 |
| 12B | Soln. No. 3 | 1 | 178 | 188 | 5.6 | 186 | 16 |
| 12C | Control | 2 | 170 | -------- | -------- | 170 | 16 |
| 12D | Soln. No. 3 | 2 | 176 | 181 | 2.8 | 179 | 16 |
| 12E | Control | 1 | 168 | -------- | -------- | 168 | 24 |
| 12F | Soln. No. 3 | 1 | 178 | 184 | 3.4 | 182 | 24 |
| 12G | Control | 2 | 186 | -------- | -------- | 186 | 24 |
| 12H | Soln. No. 3 | 2 | 162 | 172 | 6.2 | 170 | 24 |
| 12I | Control | 1 | 171 | -------- | -------- | 170 | 48 |
| 12J | Soln. No. 3 | 1 | 193 | 201 | 4.1 | 199 | 48 |
| 12K | Control | 2 | 178 | -------- | -------- | 178 | 48 |
| 12L | Soln. No. 3 | 2 | 180 | 188 | 4.4 | 187 | 48 |

12B much more tender than 12A control.

12D considerably more tender than 12C control, slightly more tender than 12B treated. No metallic flavor was noticeable on treated steak nor a pinkish cast on surface.

12F much more tender than 12E control.

12H considerably more tender than 12G control, slightly more tender than 12F treated. No metallic flavor noticeable on treated steak nor pinkish cast on surface.

12J much more tender than 12I control.

12L considerably more tender than 12K control. No metallic flavor was noticeable on treated steak nor pinkish cast on surface.

Example 8

Meat tenderizing studies with orthophosphates, acid pyrophosphates and polyphosphates:

Solution No. 6—
    12½ oz. monosodium phosphate.
    87½ oz. water.

Clear solution.

Solution No. 7—
    12½ oz. sodium acid pyrophosphate.
    87½ oz. water.

Clear solution.

Solution No. 8—
    12½ oz. disodium phosphate duohydrate.
    87½ oz. water.

Crystal formation after standing over weekend.

Solution No. 9—
    12½ oz. sodium tripolyphosphate.
    87½ oz. water.

Clear solution.

Solution No. 10—
    12½ oz. hexametaphosphate.
    87½ oz. water.

Clear solution.

Example 9

Meat used: Canner grade rib eye—sliced 1″ thick.
Test material:
    Control—Nothing.
    Liquids—See list of solutions.

| Test No. | Material | Raw weight, gms. | Dipped weight, gms. | Percent pick-up | Holding weight, gms. | Holding period, hrs. |
|---|---|---|---|---|---|---|
| 14A | Control | 154 | -------- | -------- | 154 | 16 |
| 14B | Soln. No. 6 | 171 | 176 | 2.9 | 175 | 16 |
| 14C | Control | 181 | -------- | -------- | -------- | 24 |
| 14D | Soln. No. 6 | 195 | 202 | 3.5 | -------- | 24 |
| Evaluation: No apparent difference in tenderness ||||||||
| 15A | Control | 180 | -------- | -------- | 179 | 16 |
| 15B | Soln. No. 7 | 181 | 186 | 2.7 | 185 | 16 |
| 15C | Control | 165 | -------- | -------- | -------- | 24 |
| 15D | Soln. No. 7 | 184 | 189 | 2.7 | -------- | 24 |
| Evaluation: No apparent difference in tenderness ||||||||
| 16A | Control | 165 | -------- | -------- | 165 | 16 |
| 16B | Soln. No. 8 | 176 | 186 | 5.6 | 183 | 16 |
| 16C | Control | 174 | -------- | -------- | -------- | 24 |
| 16D | Soln. No. 8 | 162 | 173 | 6.7 | -------- | 24 |
| Evaluation: The treated steaks in this test were more tender than control, but less than steaks treated with tetrapotassium pyrophosphate ||||||||
| 17A | Control | 202 | -------- | -------- | 202 | 16 |
| 17B | Soln. No. 9 | 211 | 223 | 5.6 | 220 | 16 |
| 17C | Control | 184 | -------- | -------- | -------- | 24 |
| 17D | Soln. No. 9 | 201 | 211 | 4.9 | -------- | 24 |
| Evaluation: The treated steaks in this test was more tender than control, but less than steaks treated with tetrapotassium pyrophosphate. ||||||||
| 18A | Control | 176 | -------- | -------- | 176 | 16 |
| 18B | Soln. No. 10 | 174 | 185 | 6.3 | 183 | 16 |
| 18C | Control | 181 | -------- | -------- | -------- | 24 |
| 18D | Soln. No. 10 | 187 | 196 | 4.8 | -------- | 24 |
| Evaluation: No apparent difference in tenderness on above test ||||||||

Example 10

The following composition is particularly useful in tenderizing beef cuts by dipping:

| | |
|---|---|
| Glycerin _____oz__ | 7.0 |
| Propylene glycol _____oz__ | 15.25 |
| Tetrasodium pyrophosphate _____oz__ | 3.5 |
| Potassium tetrasodium pyrophosphate _____oz__ | 14.25 |
| Monosodium glutamate _____oz__ | 2.125 |
| Casein wheat hydrolysate _____oz__ | 2.125 |
| Papain (3,800 hemoglobin units/gm.) _____gm__ | 0.30 |

Water to make one gallon.

Meat dipped in such a solution will pick up about 2 to 6 lbs. thereof per 100 pounds of meat with the specific amount being determined by the type and age of the source, length of dipping, thickness of the slices and viscosity of the solution.

A similar composition can be produced using the specified ingredients and the same amounts except that the papain is increased from 0.30 gm. to 10.0 gm.

Various changes and modifications of the invention can be made and, to the extent that such variations incorporate the spirit of this invention, they are intended to be included within the scope of the appended claims.

What is claimed is:

1. The process of improving the tenderness of beef cuts which comprises applying to the beef from about 2 to about 12 ounces of a nontoxic tetra alkali meat pyrophosphate salt, in the absence of meat curing ingredients, per 100 pounds of beef cuts and concomitantly thereto applying an effective amount of from 0.025 to 2.0 gm. of a proteolytic enzyme per 100 pounds of beef cuts to the beef cuts, and then cooling the beef cuts so treated at a temperature below 48° F., but above the freezing point of the meat for at least 6 hours before cooking the meat.

2. The process of claim 1 in which the salt is tetra potassium pyrophosphate.

3. The process of claim 1 in which the phosphate is tetrasodium pyrophosphate.

4. The process of claim 1 in which the beef is steak.

5. The process of improving the tenderness of fresh meat cuts which comprises applying to the meat from about 2 to about 12 ounces of a nontoxic tetra alkali metal pyrophosphate salt in the absence of meat curing ingredients, per 100 pounds of meat cuts, and concomitantly thereto applying an effective amount of from 0.025 to 2.0 gm. of a proteolytic enzyme per 100 pounds of meat cuts to the meat cuts, and then cooling the meat cuts so treated at a temperature below 48° F., but above the freezing point of the meat for at least 6 hours before cooking the meat.

6. A composition for improving the tenderness of meat comprising a ratio of about 2 to about 12 ounces of a nontoxic physiologically acceptable tetra alkali metal pyrophosphate to about 0.025 to 2.0 gms. of a proteolytic enzyme.

7. A composition according to claim 6 in which the pyrophosphate is tetrapotassium pyrophosphate.

8. A composition according to claim 6 in which the pyrophosphate is tetrasodium pyrophosphate.

9. A composition according to claim 6 in which the enzyme is papain.

10. A composition for improving the tenderness of meat comprising a ratio of about 2 to about 12 ounces of a nontoxic physiologically acceptable tetra alkali metal pyrophosphate to about 0.025 to 10.0 gms. of a proteolytic enzyme.

11. An aqueous solution comprising the following ingredients in a proportion of about:

12.50 oz. tetra potassium pyrophosphate,
87.50 oz. water,
16.00 oz. glycerol,
50 gm. monosodium glutamate,
63 gm. liquid vegetable hydrolysate, and
0.88 gm. papain.

References Cited in the file of this patent
UNITED STATES PATENTS

| | | |
|---|---|---|
| 2,140,781 | Allen | Dec. 20, 1938 |
| 2,471,282 | Paddock | May 24, 1949 |
| 2,852,392 | Huber et al. | Sept. 16, 1958 |
| 2,876,115 | Epstein | Mar. 3, 1959 |
| 2,903,366 | Barnett | Sept. 8, 1959 |
| 2,999,019 | Hopkins et al. | Sept. 5, 1961 |

UNITED STATES PATENT OFFICE
CERTIFICATE OF CORRECTION

Patent No. 3,147,123                                                  September 1, 1964

Stephan L. Komarik

It is hereby certified that error appears in the above numbered patent requiring correction and that the said Letters Patent should read as corrected below.

Column 2, line 12, for "dircetly" read -- directly --; column 3, line 40, before "that" insert -- and --; line 62, for "100 gm." read -- 1.00 gm. --; column 4, line 48, for "contral" read -- control --; column 6, in the table at the top of the page, under the heading "Dipping time" and opposite "Test No. 6D" for "1 min. dup" read -- 1 min. dip --; column 8, in the table, in the first line of the "Evaluation" below "Test No. 17D", for "steaks" read -- steak --; same column 8, line 63, for "meat" read -- metal --.

Signed and sealed this 22nd day of December 1964.

SEAL)
test:

RNEST W. SWIDER                                        EDWARD J. BRENNER
testing Officer                                            Commissioner of Patents